Figure 1:
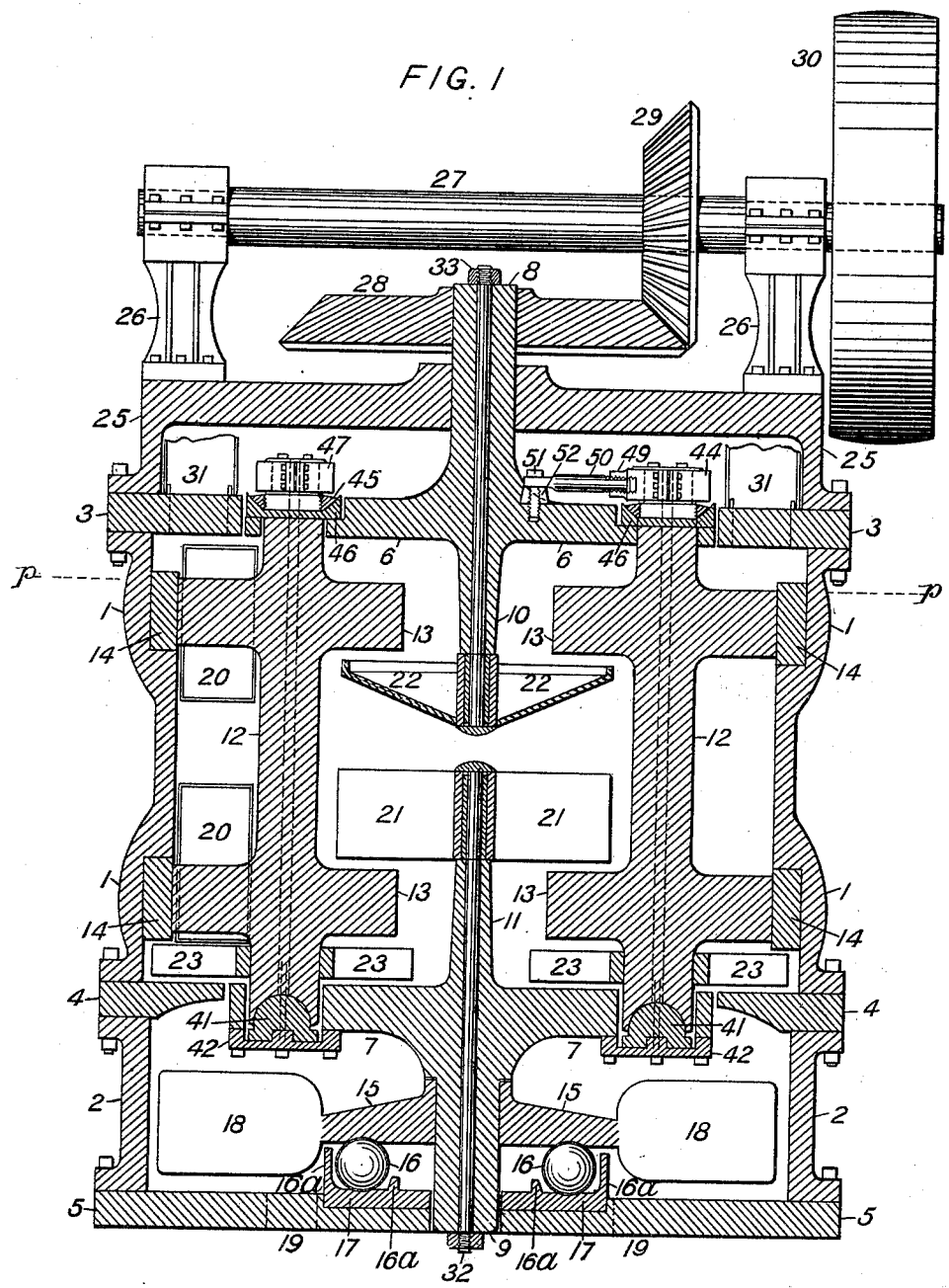

No. 626,426. Patented June 6, 1899.
F. G. JOHNSON.
CENTRIFUGAL PULVERIZING MILL.
(Application filed Nov. 16, 1898.)
(No Model.) 9 Sheets—Sheet I.

WITNESSES:
M. Johnson
F. R. Johnson

INVENTOR
Frank G. Johnson

No. 626,426. Patented June 6, 1899.
F. G. JOHNSON.
CENTRIFUGAL PULVERIZING MILL.
(Application filed Nov. 16, 1898.)

(No Model.) 9 Sheets—Sheet 2.

WITNESSES:

INVENTOR

No. 626,426. Patented June 6, 1899.
F. G. JOHNSON.
CENTRIFUGAL PULVERIZING MILL.
(Application filed Nov. 16, 1898.)
(No Model.) 9 Sheets—Sheet 3.
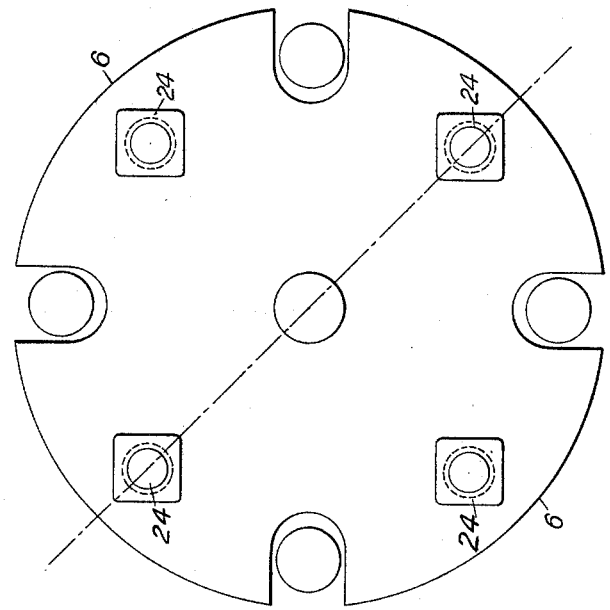
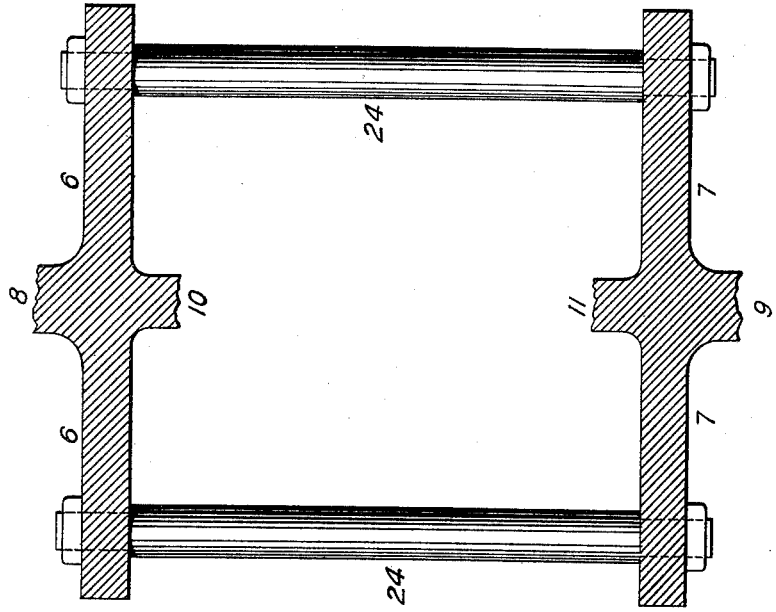
WITNESSES:
M. Johnson
F. R. Johnson
INVENTOR
Frank G. Johnson No. 626,426. Patented June 6, 1899.
F. G. JOHNSON.
CENTRIFUGAL PULVERIZING MILL.
(Application filed Nov. 16, 1898.)
(No Model.) 9 Sheets—Sheet 4.
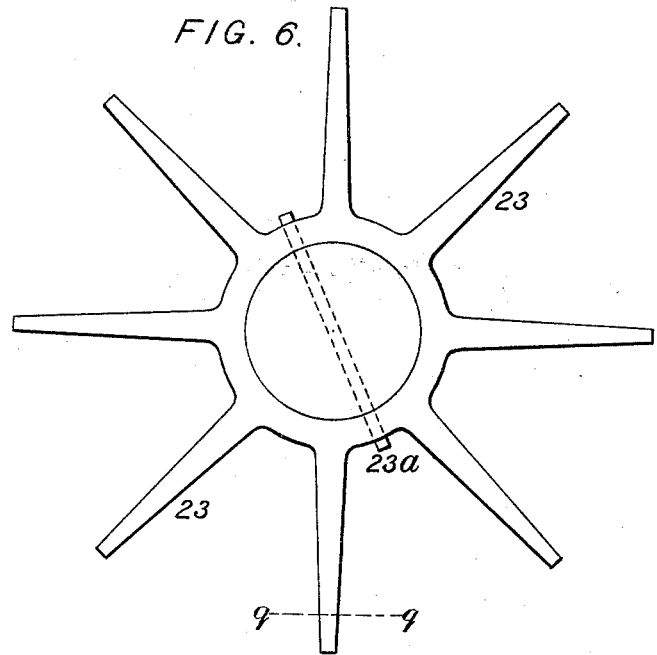
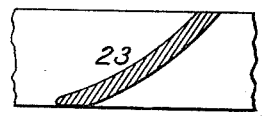
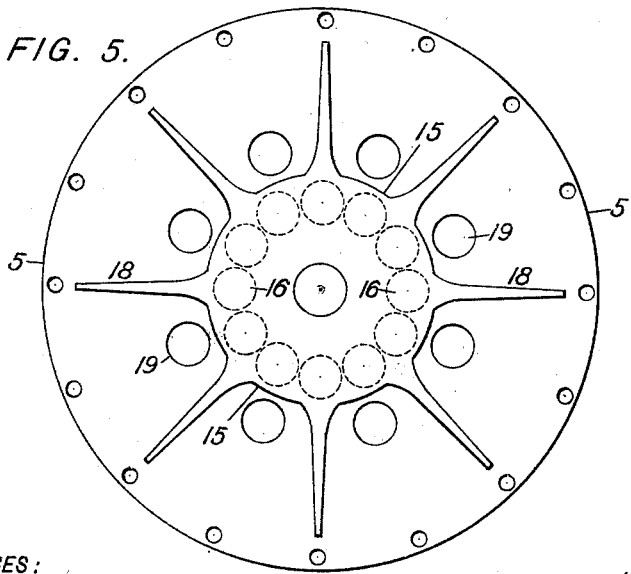
WITNESSES: INVENTOR No. 626,426. Patented June 6, 1899.
F. G. JOHNSON.
CENTRIFUGAL PULVERIZING MILL.
(Application filed Nov. 16, 1898.)
(No Model.) 9 Sheets—Sheet 5.
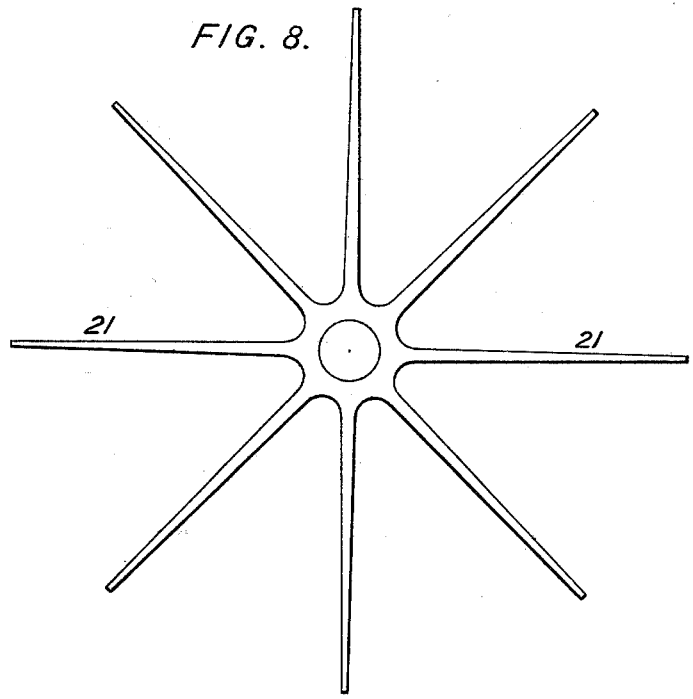
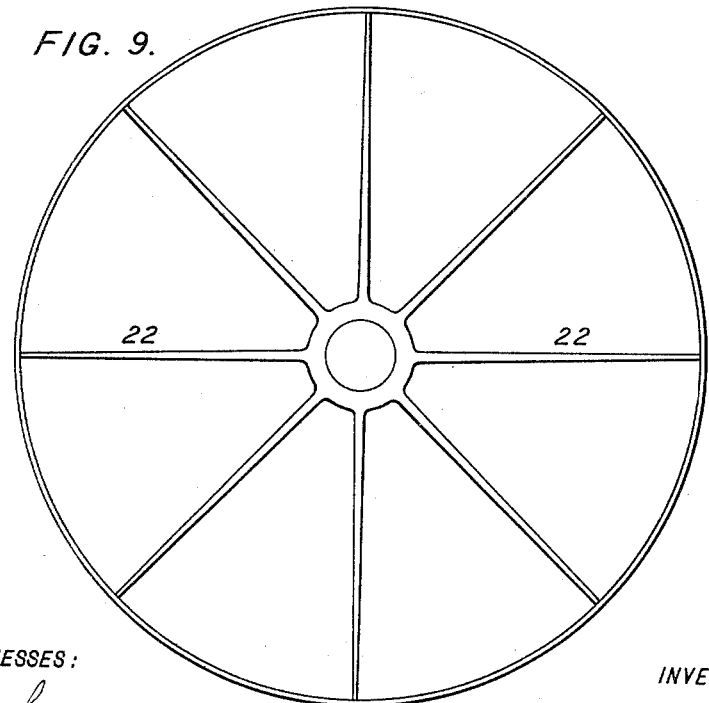
WITNESSES: INVENTOR No. 626,426. Patented June 6, 1899.
F. G. JOHNSON.
CENTRIFUGAL PULVERIZING MILL.
(Application filed Nov. 16, 1898.)
(No Model.) 9 Sheets—Sheet 6.

WITNESSES:
M. Johnson
F. R. Johnson

INVENTOR
Frank G. Johnson

No. 626,426. Patented June 6, 1899.
F. G. JOHNSON.
CENTRIFUGAL PULVERIZING MILL.
(Application filed Nov. 16, 1898.)
(No Model.) 9 Sheets—Sheet 7.
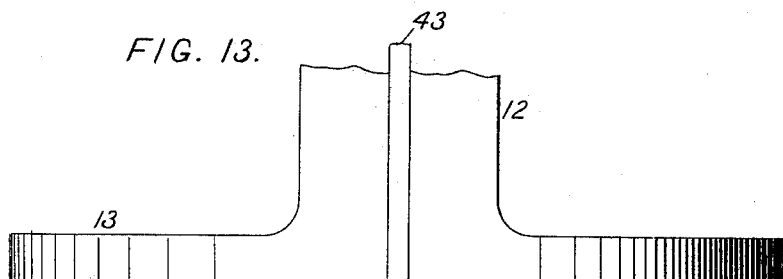
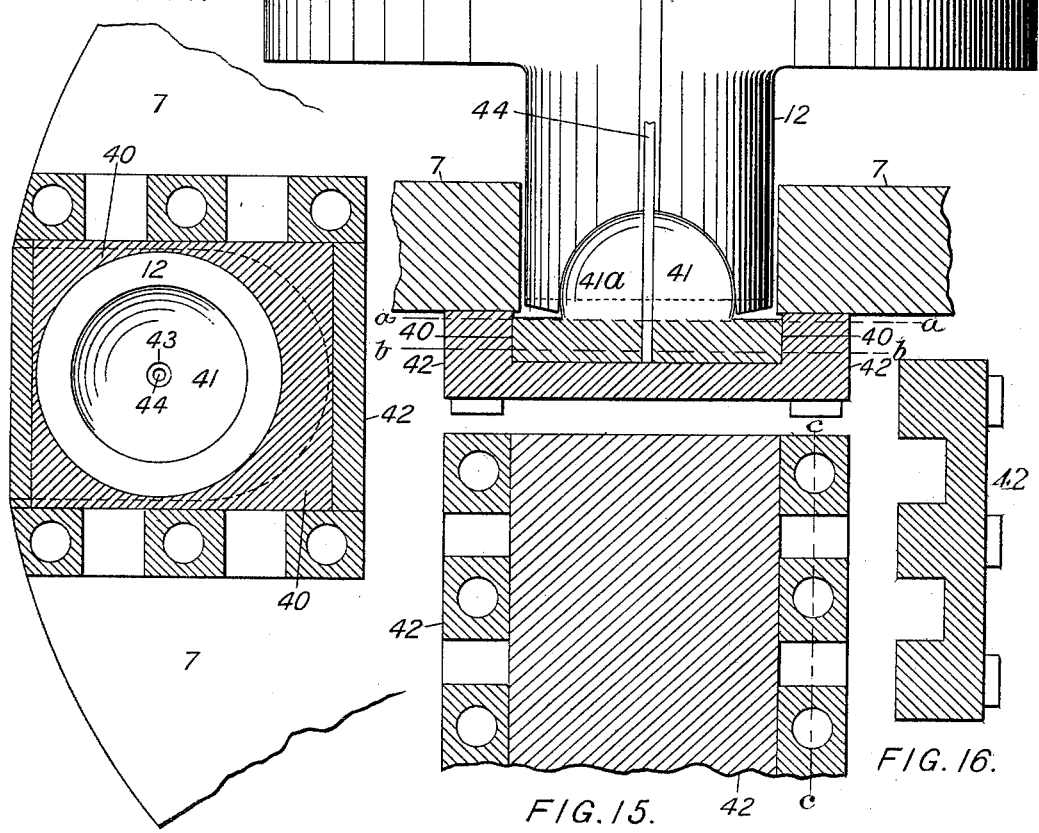
WITNESSES:
M. Johnson
F. R. Johnson
INVENTOR
Frank G. Johnson No. 626,426. Patented June 6, 1899.
F. G. JOHNSON.
CENTRIFUGAL PULVERIZING MILL.
(Application filed Nov. 16, 1898.)
(No Model.) 9 Sheets—Sheet 8.

WITNESSES:
M. Johnson
F. R. Johnson

INVENTOR
Frank G. Johnson

No. 626,426. Patented June 6, 1899.
F. G. JOHNSON.
CENTRIFUGAL PULVERIZING MILL.
(Application filed Nov. 16, 1898.)
(No Model.) 9 Sheets—Sheet 9.

WITNESSES:
M. Johnson
F. R. Johnson

INVENTOR
Frank G. Johnson

UNITED STATES PATENT OFFICE.

FRANK G. JOHNSON, OF NEW YORK, N. Y.

CENTRIFUGAL PULVERIZING-MILL.

SPECIFICATION forming part of Letters Patent No. 626,426, dated June 6, 1899.

Application filed November 16, 1898. Serial No. 696,589. (No model.)

*To all whom it may concern:*

Be it known that I, FRANK G. JOHNSON, a citizen of the United States, residing at Port Richmond, in the borough of Richmond, in the city and State of New York, have invented new and useful Improvements in Centrifugal Pulverizing-Mills, of which the following is a specification.

My invention relates to that class of pulverizing-machines employed for reducing to a more or less powdered form various mineral substances and the general construction of which consists of horizontal rollers mounted on vertical shafts, and the rollers travel on the inner surface of annular rings or dies inclosed within a suitable cylindrical case in which the pulverizing is performed between the rollers and dies by centrifugal force.

I may here state that in this class of pulverizers when two rollers are employed on each roller-shaft certain requisites in construction are indispensable to the successful action and reasonable durability of such mills, relating, first, to the means of vertically supporting the rapidly-rotating and somewhat-heavy roller-shafts and rollers; second, to the means of horizontally holding the said shafts in such a manner as will admit of their having such an extent of radial movement as is caused by the rollers passing over the material to be pulverized, the scope of which radial movement varies from nothing to an inch or so, dependent upon the fineness or coarseness of the material when it enters the mill and the rapidity with which it is fed; third, to the means of providing for the radially rocking or tilting motion of the roller-shafts caused by one of the two rollers on the same shaft passing over coarser material than the other roller at the same time; fourth, to the means of sustaining the weight of the entire rotating portion of the mill, consisting of the rollers, roller-shafts, and roller-shaft head-plates in which these are mounted and by which they are driven; fifth, to the means of preventing the frequent breakage of shafts, which has heretofore been a serious objection to this class of mills, and, sixth, the advantages of employing two rollers on each roller-shaft instead of one are manifold. The combined action of two rollers on the same shaft is more steady and uniform. They make it possible to place the journals of the roller-shafts nearer to the rollers, which prevents the shafts from breaking close to the roller where it is otherwise difficult to prevent this result, this being the weak point of pulverizing-mills. They multiply the contact-surfaces between rollers and dies within the pulverizing-chamber without correspondingly increasing the weight and cost of the mill. They require less holding force to keep them in exact position, as they mutually steady each other. They therefore prevent strain on the shafts and shaft-journals and keep them in accurate alinement with the journal-boxes. There are other advantages; but the above are sufficient for using two rollers on each shaft instead of one.

To provide the means of accomplishing these results constitutes the chief object of my invention, which I attain by the mechanism illustrated in the accompanying drawings, in which—

Figure 2:
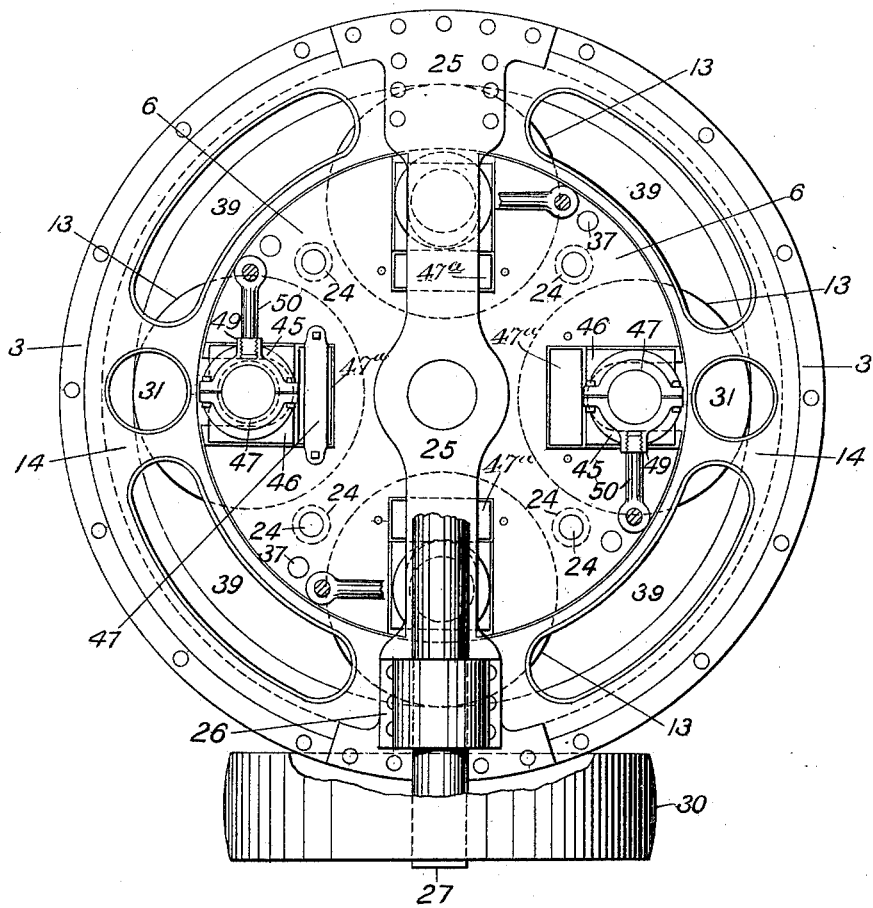
Figure 10:
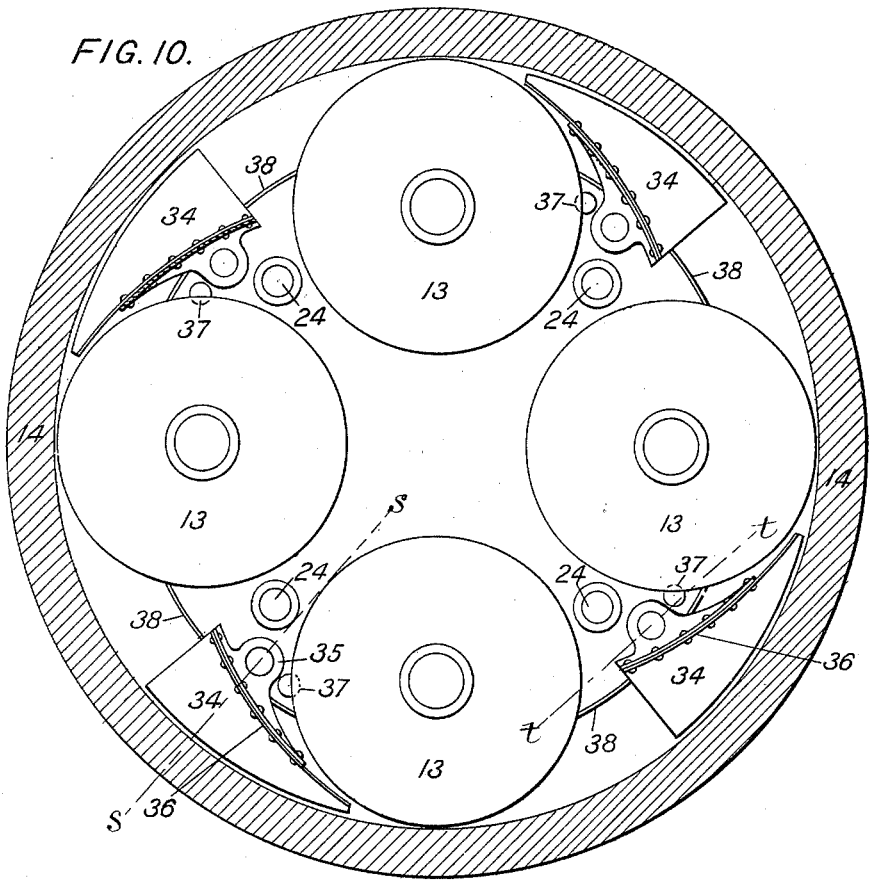
Figure 11:
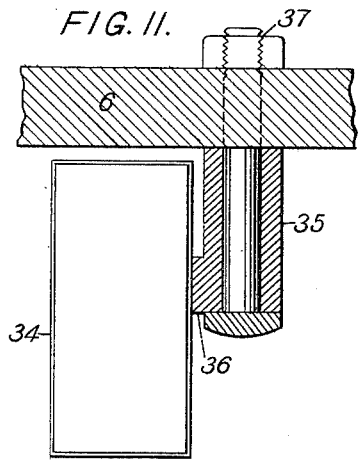
Figure 12:
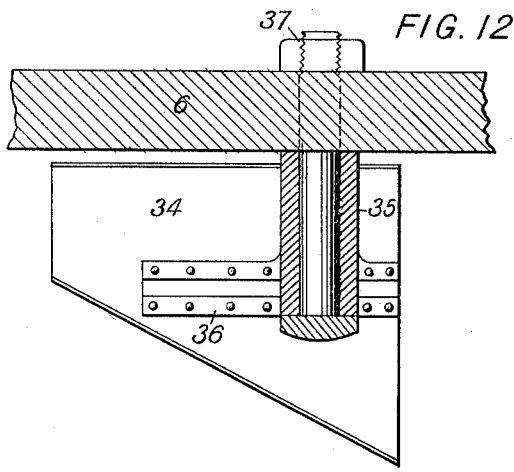
Figure 17:
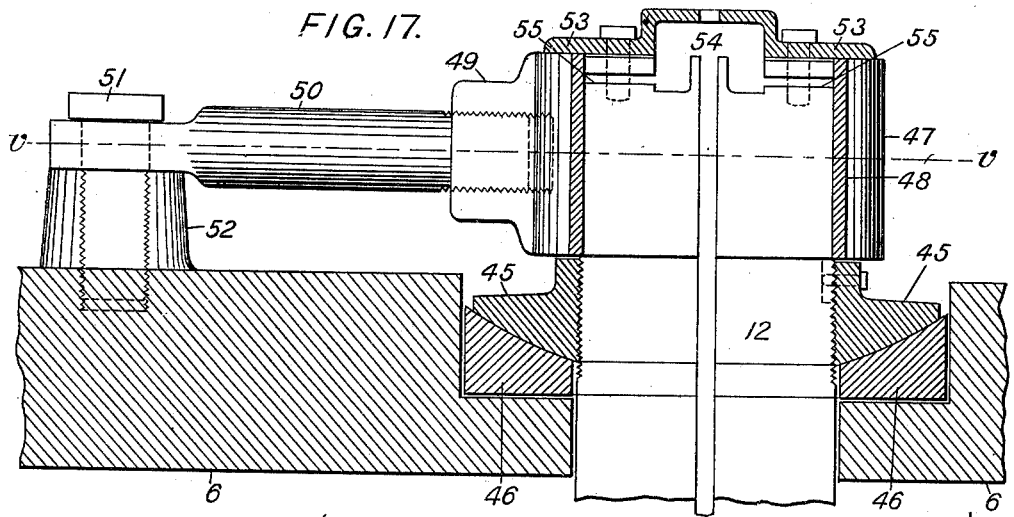
Figure 18:
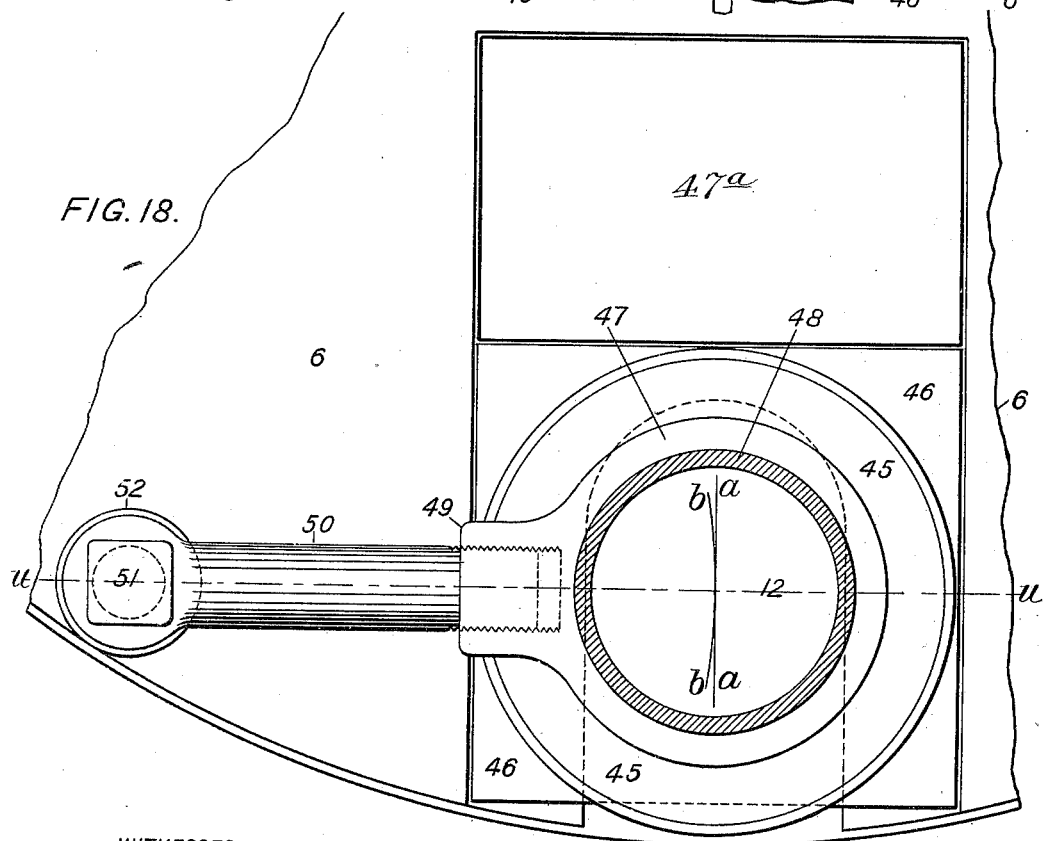
Figure 19:
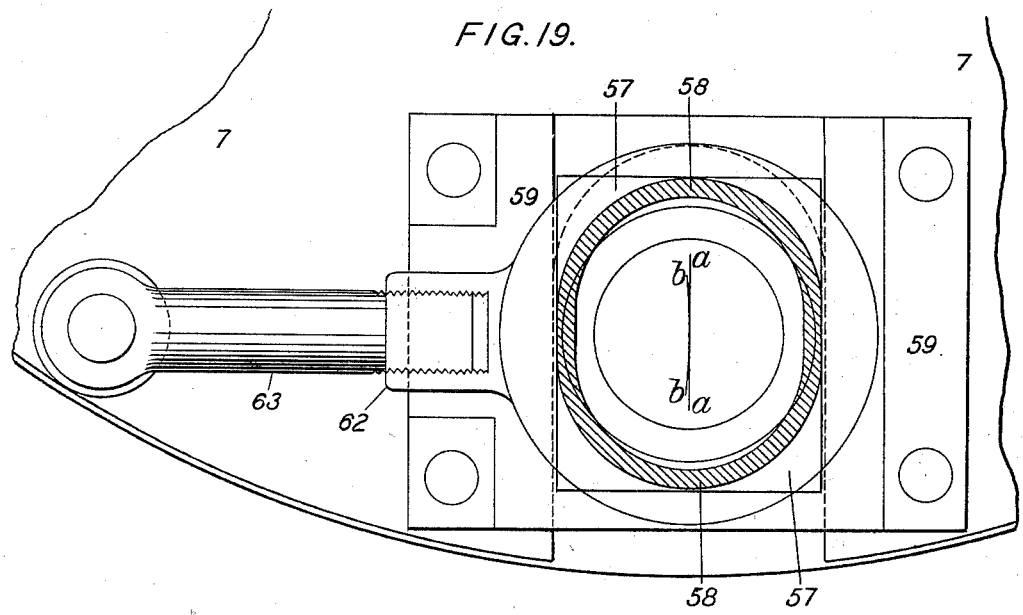

Figure 1 is a vertical section showing the principal parts of the mill; Fig. 2, a top view of the machine; Fig. 3, a vertical section of the two revolving head-plates in which are held the roller-shafts and showing in the round two of the four coupling-bars which rigidly hold said heads together; Fig. 4, a top view of Fig. 3, showing the U-shaped recesses in the periphery of the top head-plate to receive the roller-shafts, the bottom head-plate being the same. To avoid confusion of the drawings, these coupling-bars are not shown in Fig. 1. Fig. 5 is a plan view of the base-plate of Fig. 1, showing a series of circular apertures in said plate for the admission of air and a rotary saddle-plate that sustains the main shaft and underneath it in dotted lines a series of balls on which it rotates and a series of blades or wings protruding from its periphery, which serve as a blower in the lower chamber of the case of the mill; Fig. 6, an enlarged plan view of a series of twisted radial scrapers, one set of which is fastened to the bottom of and rotated by each of the roller-shafts; Fig. 7, a cross-section of one of the said scrapers on the line $q\ q$ of Fig. 6; Fig. 8, an enlarged plan view of a series of radial wings or blades placed in the mill just above the lower rollers and revolve with the rotation of the central shaft to blow and throw the material to the mouth of the lower collecting-feeders and the lower rollers; Fig. 9, an enlarged plan view of a conical disk with a series of radial partitions on its concave surface and having its concave surface uppermost, as shown in Fig. 1, and fastened on and rotated by the central shaft to throw the material diagonally upward to the mouth of the upper collecting-feeders and upper rollers; Fig. 10, a plan view with the upper head-plate and the case removed, bringing to view the upper series of rollers and the upper series of collecting-feeders and showing the upper annular die in section opposite the said rollers on the line $p\,p$ of Fig. 1 to show the relative position of the said feeders to the said rollers and die; Fig. 11, a front end view of one of the collecting-feeders, showing its carrying-sleeve and a portion of one of the head-plates to which the sleeve is secured in section on the line $s\,s$ of Fig. 10; Fig. 12, a side view of one of the collecting-feeders, showing the bracket of the carrying-sleeve to which the feeder is fastened and the said sleeve and a portion of the head-plate to which it is secured in section on the line $t\,t$ of Fig. 10; Fig. 13, an enlarged vertical view of the lower end of one of the roller-shafts, showing one of the bottom rollers and the method of vertically supporting the said shaft and its adjustable connection with the lower revolving head-plate; Fig. 14, a transverse section on the dotted line $a\,a$ of Fig. 13; Fig. 15, a transverse section on the dotted line $b\,b$ of Fig. 13, and Fig. 16 a vertical section on the dotted line $c\,c$ of Fig. 15; Fig. 17, an enlarged vertical section through the center of one of the roller-shafts at right angles to the radius passing through the center of the said shaft on the line $n\,n$ of Fig. 18; Fig. 18, an enlarged plan view of Fig. 17 on the line $v\,v$ of said Fig. 17, showing also a portion of one of the head-plates and a rubber block recessed therein; Fig. 19, an enlarged transverse view of a modification of the adjustable connection of the lower ends of the roller-shafts with the lower rotating head-plate, and Fig. 20 a vertical section of Fig. 19.

Similar numerals refer to similar parts throughout the several views.

Referring to Fig. 1, 1 1 is the vertical portion of the upper case of the mill, and 2 2 the vertical portion of the lower case; 3 3, the top annular part of the upper case, and 4 4 the annular part of the bottom of the upper case. This annular part, together with the lower head-plate 7 7, constitutes the top of the lower case. 5 5 is the bottom of the lower case.

6 6 represent what I will term the "upper" rotating head-plate, and 7 7 the lower rotating head-plate; 8, the upper end of the main or central shaft, being preferably an upward protrusion of the said upper rotating head-plate—that is, the said plate and shaft being of cast-steel and made in one piece; 9, the lower end of the main shaft, and like the upper end preferably a downward protrusion of the lower rotating head-plate, being of cast-steel and made in a single piece. These two main shafts are in alinement with each other and act in conjunction with each other by means of the coupling-bars 24 24. (See Fig. 3.) 10 is a downward-extending projection of the upper said head-piece in the form of what I will term an "upper" spindle-shaft, the purpose of which will be hereinafter explained; 11, a similar spindle-shaft extending upward from the lower of the said head-plates, the use of which also will be explained farther on. These two spindle-shafts are also preferably cast with the said head-plates, as to diminish multiplicity of pieces and joints is desirable in all pulverizing-machines. 12 12 are roller-shafts; 13 13, rollers. These roller-shafts and rollers are shown as being of steel, and each shaft and its two rollers being cast together as one piece, which I consider preferable, for the reason just before mentioned.

14 14 represent the steel annular dies on which travel the rollers; 15, a circular rotating supporting-plate, which I will term the "rotary saddle," through which extends the lower end of the main shaft 9, and to which it is keyed and by which it is vertically supported. On this rotary saddle rests all the weight of the rotating parts of the mill. The said rotary saddle in turn is supported by and revolves on a series of balls 16 16, which travel on a steel tread-plate 17 17, which said plate is embedded in the base-plate 5 5. The said balls run in a slight groove made in the lower face of the said saddle and in the upper face of the said tread-plate. Outside and inside of the said balls on the said tread-plate is an annular projection 16$^a$ 16$^a$, forming an oil-channel to be filled with oil, whereby the balls constantly travel in a flood of oil. Radially protruding from the periphery of the said rotary saddle-plate is a series of blades or wings, which serve as blower-fans, the purpose of which will be hereinafter explained. 19 19 is a series of circular apertures in the bed-plate. (See Figs. 1 and 5.)

20 20 (see Fig. 1) represent the mouth end of two of the collecting-feeders. (Fully shown in Figs. 10, 11, and 13.)

21 21 is a rotary fan consisting of a series of flat radial blades protruding from a suitable hub, which is fastened to the upward-rising spindle-shaft 11, the purpose of which is to blow and throw the material which is being pulverized outward and in range of the mouths of the lower series of the collecting-feeders. (See Figs. 1 and 8.)

22 22 is a rotary conical disk having its concave surface uppermost and is provided with vertical radiating partitions. The said disk, having a suitable hub for the purpose, is secured to the downward-extending spindle-shaft 10. The purpose of this disk and its partitions is to throw the unreduced particles of material that fall into it outward and obliquely upward in range of the mouths of the upper series of collecting-feeders. (See Figs.

1 and 9.) Of course it is not to be understood that all the material to be pulverized is first directly fed into this concave disk. In fact, no part of it is fed therein directly from the feeders, but a portion of the unpulverized material is thrown into the said disk by the rotary motion of the upper series of rollers and the rapid motion of other parts of the mill, and some will fall into it by gravity for the reason that it (the material) until sufficiently pulverized to be drawn and driven out of the mill by suction and current of air is thrown and scattered throughout the entire pulverizing-chamber of the mill and the particles not sufficiently reduced fall and more or less settle into the concave disk, as well as that which is at first thrown into it, whereby more or less of the material is constantly directed and thrown in the upper series of the collecting-feeders.

23 23 is a series of radial blades which I will term "twisted scrapers," (see Figs. 1, 6, and 7,) a set of which, having a suitable hub for the purpose, is secured to the lower end of each of the roller-shafts to prevent the material from accumulating on the bottom of the upper chamber of the case.

24 24 are bolt-coupling bars, (see Figs. 3 and 4,) of which there are four and which rigidly unite together the upper and lower rotating head-plates 6 and 7. To avoid confusion in the main view of the drawings, these coupling-bars are not shown in Fig. 1, but are specially represented in Fig. 3, in which only two of them are shown, with the said head-plates. Only the upper of said plates is shown in plan, as the lower one is of the same form as the upper one.

25 25 is a cross-head through which passes and by which is horizontally held the upper end of the main shaft 8. This cross-head is bolted to the top of the upper case of the mill. Rising from and bolted to the said cross-head are two standards 26 26, in the top of which is carried the counter motor-shaft 27 27, which connects with and operates the mill by means of the bevel-gears 28 and 29, the said counter-shaft being operated by the drive-pulley 30.

31 31 are pipes through which the material to be pulverized is fed to the mill.

The series of radial blades 21 21, Fig. 1, is fastened to the spindle-shaft 11 by clamping the hub of said blades against a shoulder on the said spindle-shaft by means of the long nut-bolt 32, which extends from the top of said hub down through the said spindle, the lower head-plate, and lower part of the main shaft 9. The concave disk 22 is fastened to the spindle-shaft 10 in like manner by the long nut-bolt 33 passing up through the said spindle-shaft, the upper head-plate, and the upper part of the main shaft 8. The radial scrapers 23 23 are secured in their position on the roller-shafts by through-and-through pins 23ª. (See Fig. 6.)

34 34 (see Figs. 10, 11, and 12) are collecting-feeders, made of sheet metal, to collect the flying material in the roller-chamber into flaring mouths at one end and discharging it from a contracted aperture between the rollers 13 and the annular dies 14. In Fig. 10 these feeders are seen from above looking down into the roller-chamber, in Fig. 11 one of them is seen looking into the flaring end thereof, and in Fig. 12 one is seen from a side view. These views, Figs. 10, 11, and 12, also illustrate the method of securing these feeders to their respective upper and lower revolving head-plates 6 and 7. 35 35 are sleeves having on one side thereof a projection flattened, prolonged, and gradually tapered into a bracket 36, to which the said feeders are fastened by rivets, as shown in Figs. 11 and 12. These bracketed sleeves 35, to which the said feeders are riveted, are fastened to their respective upper and lower head-plates 6 and 7 by clamping them to the interior surfaces thereof with nut-bolts 37 37, having the nuts of said bolts exterior to the pulverizing-chamber that they (the bolts) may be kept tightened up without access to the interior of the mill. In Fig. 10 the parallel circular lines 38 38 are drawn merely to show the relative position of these feeders to the narrow spaces between the stationary annular portion of the top of the case 3 3 and 4 4 and the revolving head-plates 6 and 7. (See Fig. 1.) In Fig. 10, 24 24 show the relative position of the clamping-bars that rigidly hold together the revolving head-plates 6 and 7.

Referring to Fig. 2, 39 39 are elongated apertures in the annular portion of the top of the case, through which is drawn off by suction the material being reduced when and as fast as it becomes sufficiently pulverized. By suction through these apertures, produced by suitable blowers and a blast of air driven into the bottom of the mill by the blower in the lower chamber, the material is taken out of the pulverizing-chamber as fast as it becomes sufficiently reduced, the degree of reduction when thus drawn off being dependent upon the strength of the said suction and blast of air—that is, the greater the draft of air the coarser will be the material drawn off, and vice versa. This method of removing the reduced material from pulverizing-mills when triturated dry has been demonstrated to be the best yet devised.

I now come to the description of the more important features of my invention by which I attain the requisites hereinbefore enumerated and which are indispensable to this class of mills.

Referring to Figs. 13 and 14, 40 represents a flat sliding foot-plate, upon the upper side of which is cast as a part of the said plate a segment of a sphere 41, it being somewhat more than half a sphere. Upon this said segment rests and rotates the roller-shaft 12, the bottom of the said shaft being provided with a semispherical socket of such diameter as will fit the said segment less what the said segment exceeds a hemisphere, as indicated by the dotted line 41ª. To facilitate this style of support and provide ample wearing-surface for the roller-shafts at their lower ends, the said shafts below the lower rollers are made a little larger than elsewhere, as shown. This sliding foot-plate 40, together with its spherical segment, I will term the "spherical" sliding foot-plate, which said plate is held in place by and is radially free to slide on the holding-bracket 42, which said bracket is bolted to the bottom of the lower head-plate 7 7 in such a manner that the said spherical foot-plate, while it is free to move radially, is laterally held in place by the projecting sides of the said holding-bracket. Fig. 16 shows a side view of this bracket with gaps in its sides, through which to allow a current of air to pass up between the roller-shafts 12 and the lower revolving head-plate 7 7. The U-shaped dotted line in Fig. 14 (see also Fig. 4) represents the recesses in the periphery of the head-plates 6 6 and 7 7 to receive the roller-shafts, and the width and depth of these recesses are somewhat greater than the diameter of the said shafts to prevent these shafts from coming into contact with the head-plates and to allow radial movement of the said shafts. That portion of the bottom of the roller-shaft that surrounds the spherical segment 41 is cut on an upward bevel to allow the said shaft to radially deviate from a vertical line without binding or being lifted from its bearing. 43, Fig. 13, represents a hole through the center of the roller-shafts to convey oil to the spherical bearings; 44, a tube to carry a portion of oil from the passage 43 to the bearing-surface between the said spherical foot-plate 40 and the supporting-bracket 42.

I will now describe the method of vertically supporting a part of the weight of the roller-shafts and rollers from the upper ends of the said shafts and the means of rigidly holding and propelling their upper ends in the circular direction of their circuit around the common center of motion, and yet allow them free radial movement, as also freedom to radially deviate from vertical lines.

Referring to Figs. 17 and 18, the U-shaped dotted line in Fig. 18 (see also Fig. 4) represents the recesses in the periphery of the upper rotating head-plate 6 6, in which is placed the roller-shafts 12, and, as before stated, these recesses are somewhat greater in width and depth than the diameter of the said shafts and for reasons before given. To carry a part of the weight of the rollers and their shafts, I secure to the upper ends of said shafts by screw-thread connection a heavy circular nut 45, the lower surface of which conforms to the segment of a sphere, having a radius equal to the distance between the upper and lower rollers, and the said nut having its bearing on a concave surface of the sliding bearing-plate 46, which said plate is recessed into the revolving head-plate 6 6, in which recess it (the said sliding plate) is laterally held, but free to radially slide to and fro. This recess in the said head-plate 6 6, as shown in Fig. 18, centrally extends much farther back than does the said sliding plate 46. The purpose of this extra extension of the recess is to receive therein a heavy plate of elastic rubber 47ª (see Fig. 2) to radially crowd the said plate to keep the rollers more or less pressed against the annular dies of the mill. These rubber plates are held in place by cross-bars bolted to the top of the rotating head-plate. (Not shown in Fig. 18. See 47, Fig. 2.) The circular bearing-nut 45 is susceptible of being turned up or down on the roller-shaft to adjust and divide the weight of the rollers and their shafts between the said upper and lower bearings. By means of the radially-sliding bearing-plate 46 at the upper end and the radially-sliding foot-plate 40 at the lower end of the roller-shaft it (the shaft) is free to move radially inward, as it will when the rollers pass over the material to be pulverized, and then move radially outward as the material becomes crushed and as the rollers and dies become more or less worn away. To hold the upper ends of the roller-shafts concentrically in their recesses in the upper head-plate and so prevent them from contact with the jaws of said recesses and to provide the means of propelling them, I inclose the upper ends of said shafts in journal-boxes 47, having a suitable bushing 48, and connect the said journal-boxes with the said head-plate by means of the swivel connecting-rods 50. The swivel ends of these rods are secured to the said journal-boxes by a free-working screw-thread connection in a lug 49 on the foremost moving side of said journal-boxes, and the fixed ends of the said rods are secured to a lug 52 (cast on the upper face of the said head-plate) by means of a tap-bolt 51, the said rod being free to swivel on the said bolt. The radial movement of the roller-shafts in pulverizers of this class is not great, not exceeding an inch and seldom more than half an inch. Therefore the deviation of the center of the roller-shaft 12 from a straight radial line $a$ $a$, Figs. 18 and 19, is exceedingly slight, as shown by the curved line $b$ $b$, and not sufficient to throw the roller-shaft into contact with the jaws of the head-plate 6 6. 53 is a recessed cap bolted to the top of the roller-shafts to exclude dust, having a suitable opening 54 in its elevated central portion through which oil can be supplied. The central portion of the top of the roller-shafts is recessed to hold oil, from which said recesses radially extend two holes 55 55 to convey oil to the journal-boxes 47. It is also through this said cap 53 that oil is supplied to the lower bearing of the roller-shafts.

Figure 20:
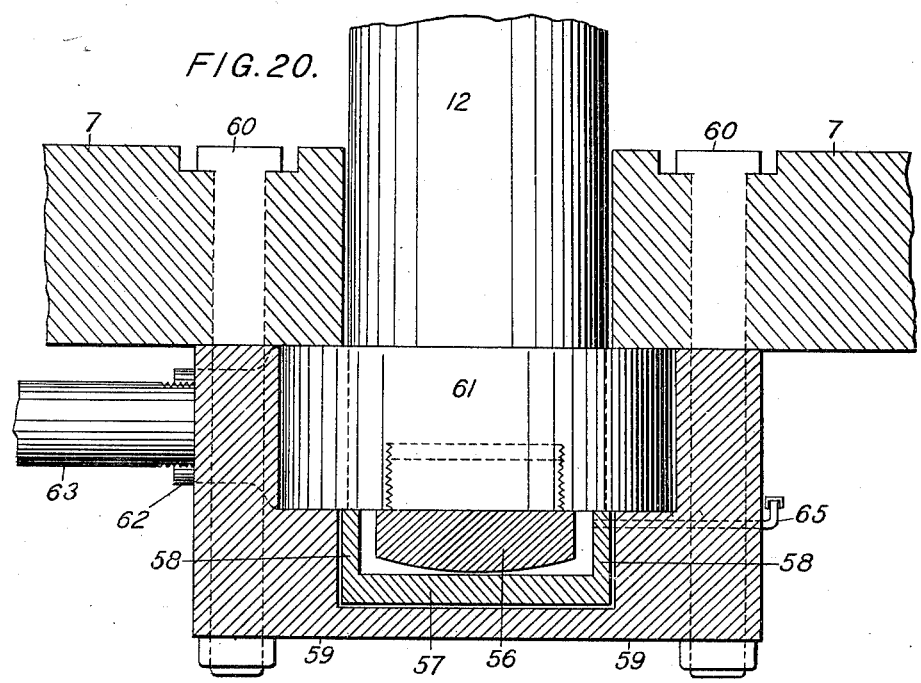

Figs. 19 and 20 illustrate a modification of the method of supporting and controlling the roller-shafts at their lower ends. 56, Fig. 20, is a shaft-step fastened, preferably screwed, into the bottom of the roller-shaft 12 and consisting of metal best suited for the purpose. 57 is a bearing-plate on which rests the step 56. From the upper face of this bearing-plate rises an oval projection 58, which forms, in the same piece of metal, an oval cup for holding free oil. This I will term the "oil-cup bearing-plate," which is to be made of such metal as is best suited to the metal composing the shaft-step 56. The object of making this cup in oval form is to allow radial movement of the bottom of the roller-shaft. This oil-cup bearing-plate is rigidly held in place by the supporting-bracket 59, which is bolted to the bottom of the revolving head-plate 7 7 by nut-bolts 60 60. 61 is a journal-box, on the foremost moving side of which is a heavy lug 62, in which is screwed by a coarse working screw-thread the swivel connecting-rod 63. The other end of this said rod is secured to the bottom of the rotating head-plate 7 7 by means of the lug 52 in the same manner that the similar rods at the top are secured to the upper head-plate 6 6. These connecting-rods at the bottom are arranged, connected, and employed as and for the same purpose as are the connecting-rods 50 at the top of the rotating part of the mill. 65, Fig. 20, is a small pipe through which oil is fed to the oil-cup bearing-plate 57.

Having pointed out the various parts of my device and set forth the different functions they respectively perform, only a brief general explanation of my invention is required.

The means to prevent friction contact of the roller-shafts with the revolving head-plates 6 and 7 by the above-described radial movement of the roller-shafts and by their movement around the common center of motion and also to furnish the means of propelling the said shafts without frictional contact with the said head-plates are provided for at the lower ends of said shafts by the spherical bearings and at the upper ends of said shafts by the connecting-rods 50. These connecting-rods hold the shafts concentrically within their recesses in the head-plate in their circular direction around the common center of motion, while they leave them (the shafts) free to take the necessarily unavoidable radial movement and the radially leaning or tilting movement. The free-working screw-thread in the lug 49 on the journal-boxes will yield to the said leaning movement. The tortuous movement of the said lug on the connecting-rod, though slight, must be provided for, as it is by the screw-thread connection between the connecting-rods and journal-boxes.

In the modification of the bearings at the lower end of the roller-shafts, as shown by Figs. 19 and 20, I use the same style of connecting-rods and journal-boxes as above described, but dispense with a sliding bearing-plate by employing the stationary oil-cup bearing-plate and provide for the radial movement of the lower end of the roller-shafts by the slipping of the shaft-step on the said plate and by making the oil cup or basin on the said plate of oval form. This method does not present so much bearing-surface for the lower end of the shafts as the spherical bearing shown in Fig. 13, but affords the advantage of being easily and cheaply repaired, which is accomplished by renewing the step 56 and the oil-cup bearing-plate 57.

The rotating head-plates 6 and 7, having the upward and downward projections and cast in one piece, supply a triple purpose—namely, that of furnishing head-plates for carrying the roller-shafts, the main shaft, (in two parts 8 and 9,) and the spindle-shafts 10 and 11, besides affording large fillets around the main shaft at its junction with the said head-plates, the points where the shafts are liable to break.

To prevent an accumulation of the material at the bottom of the pulverizing-chamber, I fasten on each roller-shaft, below its lower roller and near the bottom of the said chamber, a set of rotary twisted scrapers 23 23, (see Figs. 1, 6, and 7,) which, revolving with said shafts, keep the material from accumulating on the bottom of the said chamber and under the rollers.

By means of the series of collecting-feeders 34, Figs. 10, 11, and 12, and the series of horizontal fan-blades 21, Figs. 1 and 8, and the concave thrower 22, Figs. 1 and 9, and the twisted radial scrapers 23, Figs. 1, 6, and 7, the material to be pulverized is kept alive within the pulverizing-chamber and collected and thrown under the rollers with the utmost success.

Between the peripheries of the rotary head-plates 6 and 7 and the stationary top and bottom annular portions 3 and 4, Fig. 1, of the case 1 1 there is unavoidably a small opening or space, and so, also, are there some open spaces between the roller-shafts and said head-plates, through which will fall some of the material being pulverized unless provided against. To wholly prevent the escape of material through the said opening, I form a lower chamber to the case of the mill, as shown in Fig. 1, which I term the "blower-chamber" and which I utilize for a fourfold purpose—namely, first, for inclosing the movable supporting parts of the mill; second, for providing an automatic blower to drive a current of air up through the various spaces above described to prevent the material from falling through the same; third, for preventing by the said current the material from accumulating around the bearings at the bottom of the mill, and, fourth, for facilitating by the said current the extraction of the sufficiently-pulverized material through the suction-openings 39 39, Fig. 2, at the top of the mill by driving the pulverized portion of the material to the upper part of the pulverizing-chamber.

The movable or rotating parts of the mill, consisting of the roller-shafts, the rollers, the two head-plates 6 and 7, the collecting-feeders, the rotary scrapers 23, the fan-blades 21 on the lower spindle-shaft 11, the concave diagonally-upward thrower 22 on the upper spindle-shaft 10, the main shafts 8 and 9, and the driving cog-wheel 28, Fig. 1, must all be carried on a step-bearing, which is too much weight for the foot of the main shaft to sustain with an ordinary step-bearing at the rate of speed required for the said shaft. Therefore for the support of the main shaft I employ a rotary steel saddle-plate 15 15, Fig. 1, which is keyed to and vertically sustains the said shaft, it (the shaft) being extended down into the bed-plate of the mill to afford it, if needed, lateral support. This saddle-plate rests and rotates upon the series of balls 16 16, which in turn rest upon the steel tread-plate 17, recessed into the bed-plate of the mill 5 5. The annular elevations 16$^a$ 16$^a$ on the said tread-plate 17, one on the inside and the other on the outside of the said balls, form a channel for always keeping the balls flooded with lubricating-oil, which renders them and the said tread-plate durable and diminishes the friction of the main shaft to a minimum. Attached to and radially extending from the periphery of the said saddle-plate is a series of blower wings or blades 18 18, which, together with the said saddle-plate as a hub and being attached to and propelled by the main shaft 9, make an automatic blower, whereby I create a current of air supplied through the intake-apertures 19 19 in the bed-plate 5 5, which is driven up through the various openings above mentioned, and thence through the pulverizing-chamber, for the purposes hereinbefore explained.

It will be observed that there are no nuts or bolts employed inside of the pulverizing-chamber to become displaced and endanger the integrity of the mill.

I am aware that collecting-feeders are not new in pulverizing-mills, and therefore I shall not claim them broadly, but limit myself, relating to these, to the method of their attachment to the mill.

Having pointed out the various parts of my device and explained the general operation of my invention, what I claim as new and useful, and desire to secure by Letters Patent, is—

1. In a centrifugal pulverizing-mill, two or more vertical roller-shafts each of the same having two horizontal rollers, the upper and lower roller-shaft-holding head-plates 6 and 7 rigidly held together by coupling-bars and each of the said head-plates having a separate central main shaft in vertical alinement with each other, and each of said head-plates having a central spindle-shaft extending toward each other the lower one of which having mounted thereon a series of radial fan-blades and the upper one of the said spindle-shafts having mounted thereon an upturned concave disk having vertical radiating partitions, in combination with an inclosing case having annular dies for the tread of the said rollers, substantially as and for the purpose set forth.

2. In a centrifugal pulverizing-mill, two or more vertical roller-shafts each having two horizontal rollers, the upper and lower roller-shaft-holding head-plates 6 and 7 rigidly held together by coupling-bars and each of the said head-plates having a separate central main shaft in vertical alinement with each other, and each of said head-plates having a central spindle-shaft extending toward each other the lower one of which having mounted thereon a series of radial fan-blades and the upper one of which having mounted thereon an upturned concave disk having vertical radiating partitions, in combination with an upper inclosing case having annular dies for the tread of the said rollers and a lower case having within it an automatic blower mounted on the lower main shaft, as and for the purpose set forth.

3. In a centrifugal pulverizing-mill, two or more vertical roller-shafts each of the same having two horizontal rollers the upper and lower roller-shaft-holding head-plates 6 and 7 rigidly held together by coupling-bars, the said roller-shafts having their vertical support on radially-sliding plates held to the said head-plates by suitable brackets, and the said roller-shafts having their horizontal support and propulsion in the direction of their circuit around the common center of motion by swivel connecting-rods, the movable swivel ends of the said rods being secured to the journal-boxes of the said roller-shafts and the fixed ends thereof to the said head-plates, in combination with a surrounding case having annular dies for the tread of the roller; whereby the said roller-shafts are immovably held in a vertical position in the direction of their circuit around the common center of motion and yet are free to move and lean in a radial direction, as and for the purpose set forth.

4. In a centrifugal pulverizing-mill, two or more vertical roller-shafts each of the same having two horizontal rollers, the upper and lower roller-shaft-holding head-plates 6 and 7 rigidly held together by coupling-bars, the said head-plates having separate central main shafts in vertical alinement with each other, and the said roller-shafts at both ends thereof having vertical support on radially-sliding and spherically-segmental bearings supported by the said head-plates, and the said roller-shafts having their upper ends connected to the upper said head-plate by swivel connecting-rods, said rods having their swivel ends secured to the journal-boxes of the said roller-shafts and their fixed ends to the said upper head-plate, in combination with an inclosing case having annular dies for the tread of the said rollers; whereby the roller-shafts are held in vertical position in the direction of their circuit around the common center of motion, and yet are free to move and lean in a radial direction, as and for the purposes described.

5. In a centrifugal pulverizing-mill, two or more vertical shafts each of the same having two horizontal rollers, the upper and lower roller-shaft-holding head-plates 6 and 7 rigidly held together by coupling-bars and mounted on separate central main shafts in vertical alinement with each other, and each of the said roller-shafts having secured thereto underneath its lower roller a series of twisted radial scraper-blades, and the said roller-shafts having spherical bearing-sockets in the lower ends thereof and said shafts having their support on a radially-sliding spherically-segmental bearing having an enlarged flat bearing-surface and the said segmental bearing-plate being secured to the bottom of the said lower head-plate by a suitable holding-bracket on which the spherical bearing-plate is free to move radially and held by the said bracket from moving in any other direction, in combination with a case having annular dies for the tread of the rollers, as and for the purposes set forth.

6. In a centrifugal pulverizing-mill, two or more vertical shafts each of the same having two horizontal rollers, the upper and lower roller-shaft-holding head-plates 6 and 7 rigidly held together by coupling-bars, the said head-plates being mounted on outward-extending separate central main shafts in vertical alinement with each other, and each of the said head-plates having an inward-extending spindle-shaft, the lower one of said spindle-shafts having mounted thereon a series of radial fan-blades having a suitable hub therefor and the upper one of said spindle-shafts having mounted thereon an upturned concave disk having vertical radial partitions, the said roller-shafts being connected with and propelled by the said head-plates, and the central main shaft of the lower head-plate having for its vertical support the ball-supported rotary saddle-plate 15 having on its periphery a series of radial blower-fans, in combination with an upper pulverizing-case having annular dies for the tread of the said rollers and a lower blower-case having air-admitting apertures in the bottom thereof, as and for the purposes set forth.

7. In a centrifugal pulverizing-mill, two or more vertical roller-shafts each of the same having two horizontal rollers, the upper and lower head-plates 6 and 7 rigidly fastened together by coupling-bars mounted on separate main central shafts in alinement with each other, the said roller-shafts having their horizontal support and propulsion in the direction of their circuit around the common center of motion by swivel connecting-rods, the swivel ends of said rods being secured to the journal-boxes of the said roller-shafts and the fixed ends thereof to the said head-plates, in combination with a pulverizing-case having annular dies for the tread of the rollers, and an air-chamber underneath the pulverizing-case having therein a rotary blower mounted on and operated by the said main shaft, substantially as and for the purpose set forth.

8. In a centrifugal pulverizing-mill, two or more vertical roller-shafts each of the same having two horizontal rollers an upper and lower head-plate rigidly fastened together by coupling-bars and mounted on separate central main shafts in alinement with each other the said roller-shafts having their vertical support on radially-sliding plates held to the said head-plates by suitable brackets and the said roller-shafts having their horizontal support and propulsion in the direction of their circuit around the common center of motion by swivel connecting-rods the movable swivel ends of said rods being secured to the journal-boxes of the said roller-shafts and the fixed ends thereof to the said head-plates and the said head-plates having a series of funnel-shaped collecting-feeders fastened thereto, in combination with an inclosing case having annular dies for the tread of the said rollers, as and for the purpose described.

9. In a centrifugal pulverizing-mill, two or more vertical roller-shafts each of the same having two horizontal rollers the upper and lower roller-shaft head-plates 6 and 7 mounted on separate central main shafts in alinement with each other, the lower one of the said main shafts at its lower end being fastened to and having its vertical support on a rotary saddle-plate, the said saddle-plate having for its support and on which it revolves a series of balls having their treadway in an annular oil-channel, in combination with an inclosing case having an upper and lower chamber and having in the upper chamber annular dies for the tread of the said rollers and having in the lower chamber a fan-blower mounted on and operated by the main shaft of the mill substantially as and for the purpose set forth.

FRANK G. JOHNSON.

Witnesses:
M. JOHNSON,
F. R. JOHNSON.